(12) United States Patent
Kirtland et al.

(10) Patent No.: US 10,562,570 B2
(45) Date of Patent: Feb. 18, 2020

(54) MOUNTING PILLARS FOR A DRIVE ASSEMBLY

(71) Applicant: Honda Motor Co., Ltd., Tokyo (JP)

(72) Inventors: Dakota D. Kirtland, Dublin, OH (US); Daniel T. Sellars, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 15/846,428

(22) Filed: Dec. 19, 2017

(65) Prior Publication Data

US 2019/0185058 A1 Jun. 20, 2019

(51) Int. Cl.
*B60G 3/20* (2006.01)
*B62D 21/11* (2006.01)
*B62D 21/18* (2006.01)

(52) U.S. Cl.
CPC ............ *B62D 21/11* (2013.01); *B62D 21/183* (2013.01); *B60G 3/20* (2013.01); *B60G 2200/144* (2013.01); *B60G 2300/07* (2013.01); *B60G 2300/124* (2013.01)

(58) Field of Classification Search
CPC ........ B62D 21/11; B62D 21/183; B60G 3/20; B60G 7/02; B60G 2200/144; B60G 2300/08; B60G 2300/124; B60G 2200/422; B60G 2204/147; B60G 2204/19; B60G 2206/0114
See application file for complete search history.

(56) References Cited

U.S. PATENT DOCUMENTS

| 4,943,092 | A | 7/1990 | Haraguchi |
| 7,048,286 | B2 | 5/2006 | Eppelein |
| 7,770,907 | B2 | 8/2010 | Shimizu et al. |
| 8,474,844 | B2 | 7/2013 | Kwon et al. |
| 9,238,394 | B2 | 1/2016 | Leibl |
| 9,346,492 | B2 | 5/2016 | Oshima et al. |
| D814,979 | S * | 4/2018 | Cantuern .................. D12/160 |
| 10,207,554 | B2 * | 2/2019 | Schroeder ............. B60G 7/001 |
| 2004/0206567 | A1 * | 10/2004 | Kato ........................ B60G 7/02 180/291 |
| 2008/0308334 | A1 * | 12/2008 | Leonard ................. B60K 37/00 180/89.1 |
| 2011/0094813 | A1 * | 4/2011 | Suzuki ................... B60K 13/04 180/89.2 |

FOREIGN PATENT DOCUMENTS

| CN | 203496594 U | 3/2014 |
| EP | 1966029 B1 | 9/2010 |
| EP | 2581240 A1 * | 4/2013 |
| WO | 2007080281 A1 | 7/2007 |

* cited by examiner

*Primary Examiner* — Ruth Ilan
(74) *Attorney, Agent, or Firm* — Honda Patents & Technologies North America, LLC; Clifford B Vaterlaus

(57) ABSTRACT

A two pillar mount for a vehicle powertrain component wherein each pillar has two mirrored side walls formed on opposite ends of a joining wall. The side walls have mirrored recesses at a lower end to receive a lower frame member, and mirrored recesses at an upper end to receive upper frame members of a vehicle. Each pillar further includes attachment points to suspension members of the vehicle, and attachment points to the vehicle's powertrain component.

20 Claims, 4 Drawing Sheets

MOUNTING PILLARS FOR A DRIVE ASSEMBLY

BACKGROUND

The final drive assembly of a vehicle is often a complicated arrangement including a gear assembly, upper and lower frame members, and linkages to suspension components of the wheels.

Conventional final drive assemblies often complicate access to the gear assembly, which requires routine maintenance. It may be particularly difficult to service or remove the gear assembly once the final drive assembly is complete. Likewise, conventional final drive assemblies often complicate installation of the gear assembly and/or linkages when forming the final drive assembly.

BRIEF SUMMARY

In accordance with one embodiment of the present disclosure, a two pillar mount for a final drive assembly is formed using two pillars. Each pillar has two mirrored side walls formed on opposite ends of a joining wall. The side walls have mirrored recesses at a lower end to receive a lower frame member, and mirrored recesses at an upper end to receive upper frame members of a vehicle. Each pillar further includes attachment points to suspension members of the vehicle, and attachment points to the vehicle's powertrain component, such as a gear assembly. The pillars thus enable a powertrain component that couples the upper frame body of the vehicle with the lower frame body of the vehicle, with the powertrain component mounted therebetween. The pillars when mounted form an access gap for conveniently installing, servicing, or removing the powertrain component.

In accordance with another embodiment of the present disclosure, a powertrain component mount assembly includes a pair of pillars. Each pillar has a joining wall with a transverse directed attachment point for attaching to a powertrain component. Two side walls are formed on opposite ends of the joining wall. The side walls have first recesses at a lower end for attaching to a lower frame member, and second recesses at an upper end for attaching to upper frame members. The side walls have first drive axis directed attachment points proximal to the upper end for attaching to upper suspension members, and second drive axis directed attachment points proximal to the lower end for attaching to lower suspension members.

In accordance with another embodiment of the present disclosure, a mount for a powertrain component of a vehicle includes a plurality of singular pillars. Each pillar including an upper attachment point for an upper suspension member. The upper attachment point accepting along a first axis a first removable fastener to couple with the upper suspension member. Each pillar also including a lower attachment point for a lower suspension member. The lower attachment point accepting along the first axis a second removable fastener to couple with a second suspension member. Each pillar further including an intermedial attachment point for the powertrain component. The intermedial attachment point positioned between the upper attachment point and the lower attachment point. The intermedial attachment point accepting, along a second axis substantially perpendicular to the first axis, a third fastener to couple with the powertrain component.

In accordance with yet a further embodiment of the present disclosure, a vehicle powertrain component mount assembly includes a pair of pillars spaced apart in a lateral direction of a vehicle to define a gap between the pair of pillars. A powertrain component is disposed in the gap and directly attached to the pillars such that forces acting on the pair of pillars are transferred to the powertrain component.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-4, wherein like numbers indicate the same or corresponding elements throughout the views.

Figure 1:
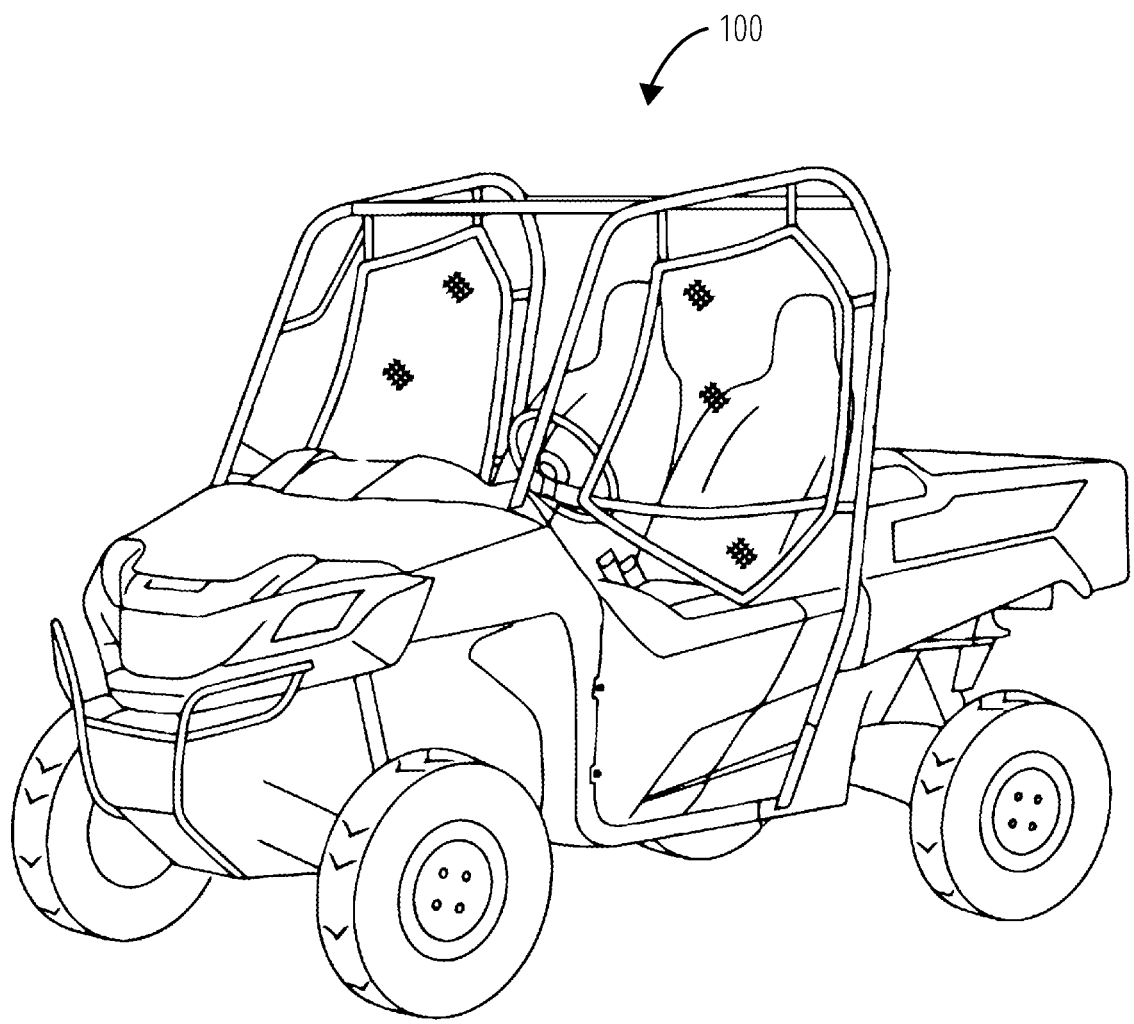
FIG. 1 illustrates an embodiment of an off road vehicle 100.

Referencing FIG. 1, an off road vehicle 100 is a type of vehicle with high drive torque capacity and long travel suspension. The constraints of an off road vehicle 100 make it challenging to package the drive assembly in a manner where it can be installed and serviced but also maintain narrow mounting points for the suspension such that the width of the vehicle is within an acceptable limit and driveshaft angles do not exceed their mechanical limits. It will be appreciated that the principles of the present disclosure may be applicable to the off road vehicle 100 as well as various other types of vehicles, such as automobiles, trucks, construction or farm equipment, or the like.

Figure 2:
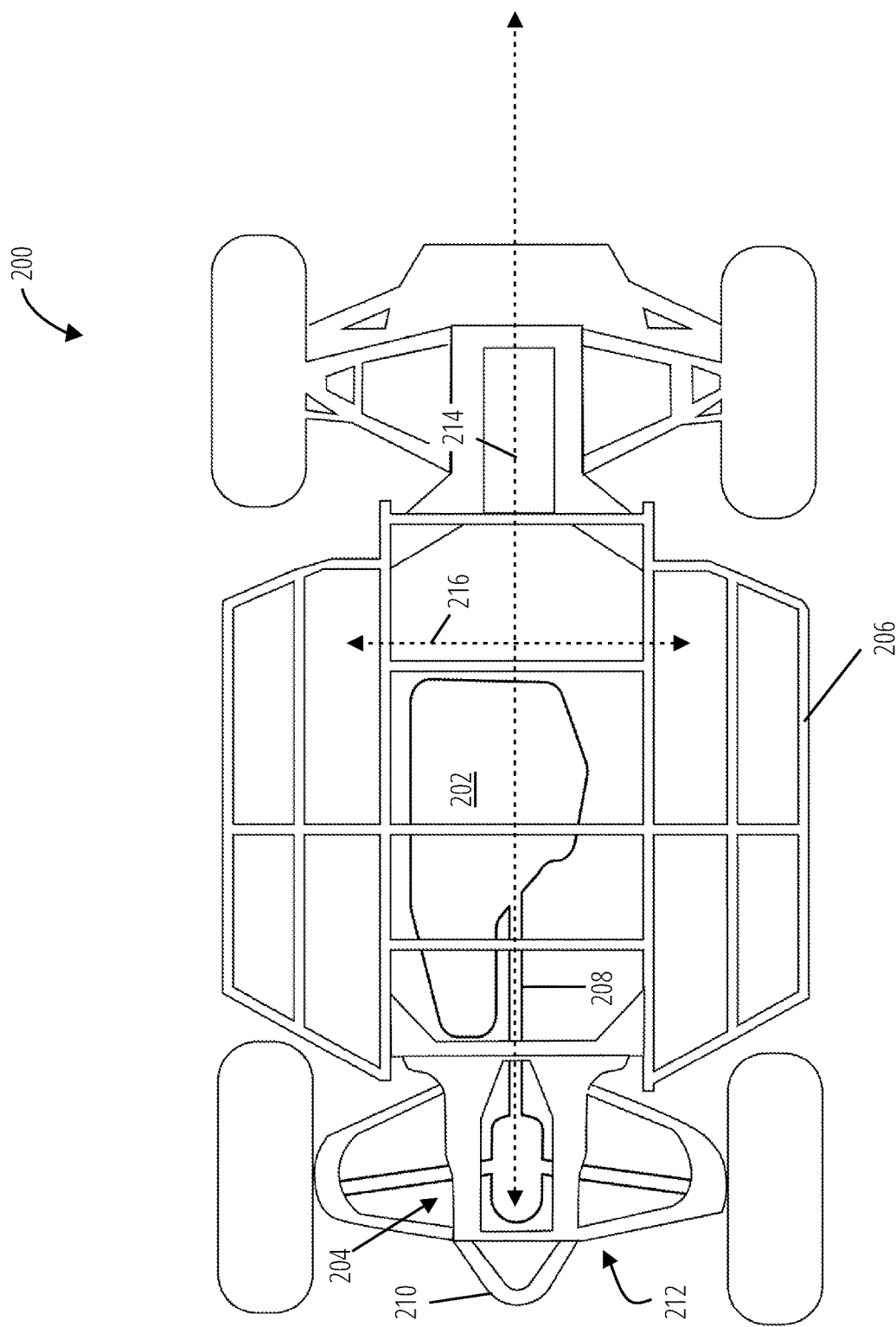
FIG. 2 illustrates a bottom view of a vehicle frame 200.

Referencing FIG. 2, the vehicle frame 200 has a drive axis 214 traversing the length of the lower frame body 206 centrally through the drive assembly 204, and the propeller shaft 208 as it engages a motor 202 of the off road vehicle. A transverse axis 216 runs perpendicular to the drive axis 214 in a lateral direction of the vehicle 100.

Figure 3:
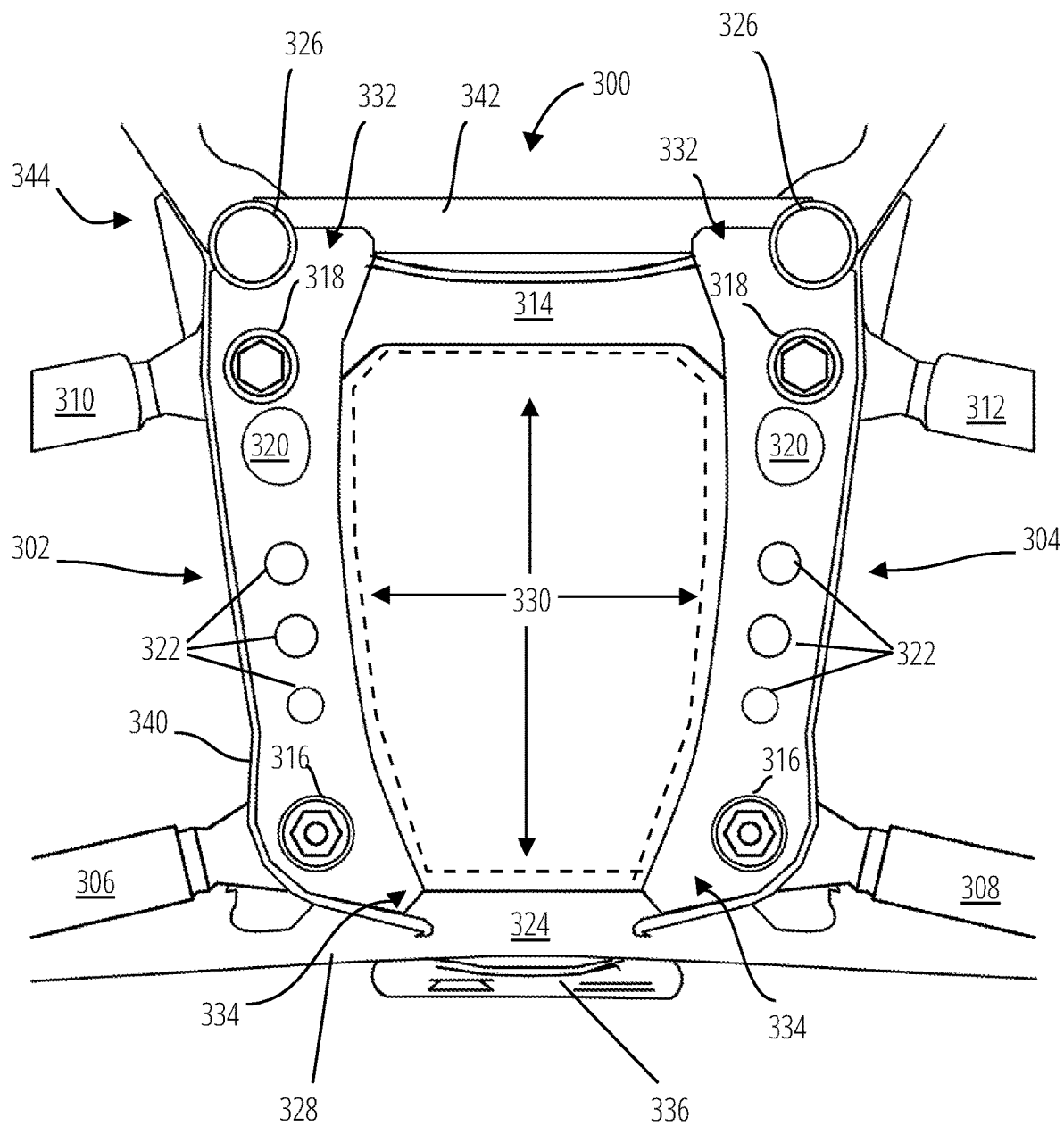
FIG. 3 illustrates a front view of an embodiment of a drive mounting 300.
Figure 4:
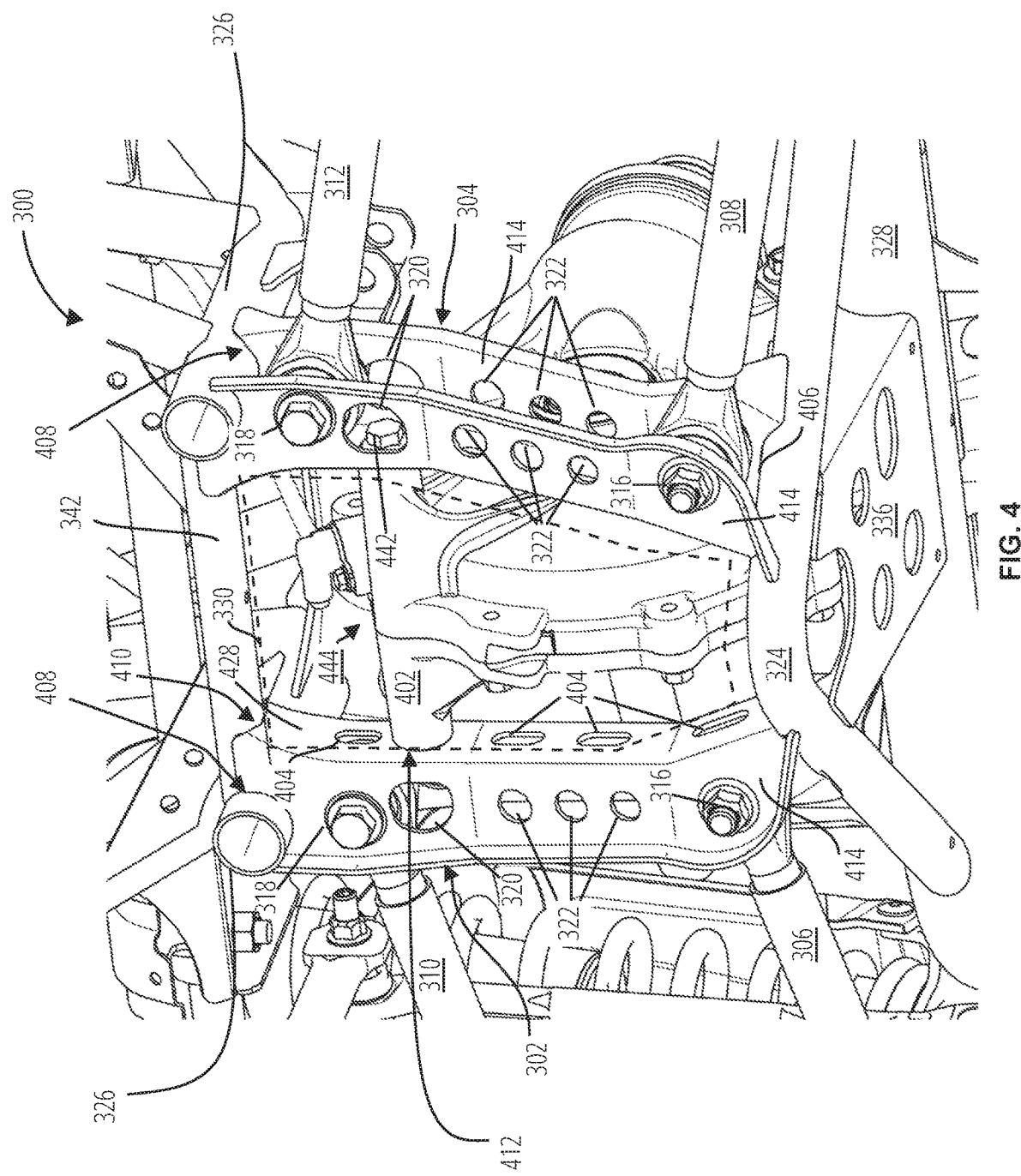
FIG. 4 illustrates a lower perspective view of an embodiment of a drive mounting 300.

Referencing FIG. 3 and FIG. 4, a drive mounting 300 supports a powertrain component 444 between an upper frame body 344 and a lower frame body 328 of the off road vehicle 100. The powertrain component 444 may include a gear assembly, such as a transaxle, a differential, or a spool that does not allow differentiation of wheel rotation or speed. Accordingly, it will be understood that the phrase "powertrain component" as used herein shall be construed to include a housing having parts such as gears, or an engine, or transmission, within the scope of the present disclosure, The drive mounting 300 includes a first upright pillar 302, a second upright pillar 304, an upper bracket 314, and a skid plate 336. The upper frame body 344 and the lower frame body 328 are coupled together by way of the first upright pillar 302 and the second upright pillar 304.

An upper bracket 314 is installed atop the powertrain component 444 and forms an upper boundary of a drive assembly access gap 330. The first upright pillar 302 and the second upright pillar 304 form sides of the drive assembly access gap 330, and a tow hook mount 324 forms a lower boundary of the drive assembly access gap 330.

A skid plate 336 bridges a section of the lower frame body 328 forming a gap of the tow hook mount 324. The first upright pillar 302 and the second upright pillar 304 are mirrored components positioned opposite one another across the drive assembly access gap 330. The first upright pillar 302 and the second upright pillar 304 each comprise an upper end 332 and a lower end 334. The upper end 332 is proximal with an upper suspension coupling 318 that pivotably couples a first upper suspension member 310 and a second upper suspension member 312 to the first upright pillar 302 and the second upright pillar 304, respectively. Similarly, the lower end 334 of the pillars is proximal to a lower suspension coupling 316 that pivotably couples the first lower suspension member 306 and the second lower suspension member 308 to the first upright pillar 302 and the second upright pillar 304, respectively.

Both the first upright pillar 302 and the second upright pillar 304 include lightening holes 322 in mirrored side walls 414, lightening holes 404 in a joining wall 428, and an access hole 320. The lightening holes 322 and lightening holes 404 are perforations that reduce the weight of the pillars sized and positioned so as not to unduly compromise the strength of the pillars. The access hole 320 is an opening positioned between the lightening holes 322 and the upper suspension coupling 318. The access hole 320 is disposed towards a lateral engagement point for securing a mount section 402 of the powertrain component 444 to the pillars. The access hole 320 permits tools to engage a mounting fastener 442 to a joining wall 428 of the pillars.

Each of the pillars further comprises a flange 340 on the side walls 414. Each of the pillars further comprises a lower recess 406 to receive the tow hook mount 324, a first upper recess 408 to receive upper frame body drive axis directed members 326, and a second upper recess 410 to receive an upper frame body transverse directed member 342. More generally, the ends of the pillars may be formed to receive tubular frame members along the different orientations described and illustrated, although the invention is not limited to engagement with tubular members. The first upper recess 408 is formed in the side walls 414 in a first direction, and the second upper recess 410 is formed in the side walls 414 in a second direction perpendicular to the first direction.

The two pillars are utilized to mount the powertrain component 444, the lower frame body 328, and the upper frame body 344 of the off road vehicle 100. Each of the pillars may be a singular component (where "singular" refers to being formed from a single piece of material, without fasteners).

The joining wall 428 of each pillar includes a transverse directed attachment point 412 to receive the mounting fastener 442 to couple with the powertrain component 444. The side walls 414 are mirrored on opposite ends of the joining wall 428, effectively creating a ½ I-beam shape for each pillar. The lower recess 406 is mirrored on each of the side walls 414 at the lower end 334 to receive and couple with (e.g., via welding) the tow hook mount 324 (i.e., tow frame member or lower frame member). The first upper recess 408 is mirrored on each of the side walls 414 at the upper end 332 to receive and couple with (e.g., via welding) the upper frame body drive axis directed members 326. The joining wall 428 includes a second upper recess 410 to receive and couple with the upper frame body transverse directed member 342. "Lower" and "upper" in this sense refer to the relative position of the ends when the pillars are mounted substantially vertically relative to the ground.

The upper suspension coupling 318 is directed to receive fasteners along the drive axis 214 to couple with the upper suspension members (e.g., suspension links). The lower suspension coupling 316 is proximal to the lower end 334 and also directed to receive fasteners along the drive axis 214, to couple with the lower suspension members. At least one of the side walls of each pillar includes an access hole adjacent to the transverse directed attachment point 412 of the joining wall 428. The joining wall 428 includes a third recess 410 at the upper end 332 to receive and couple with the transverse member 342 of the upper frame body.

The pillars are shaped such that when mounted uprightly in a mirrored configuration, as illustrated, the drive assembly access gap 330 thus formed has an inner separation that widens from the lower end 334 to the upper end 332. Accordingly, in some embodiments, the powertrain component 444 can be unfastened and removed from the rear through the access gap 330.

It will be understood that the present disclosure provides a mounting arrangement that allows the frame body to triangulate and manage both suspension and powertrain component reaction loads using the same members, reducing part count, cost, and weight. Also, the present arrangement can utilize the structure of the powertrain component as a loaded member by coupling the upper and lower frame sections together, reducing the need for additional members to carry the suspension loads in the area of the powertrain component. Finally, significant complexity, cost, weight, and part count may be reduced by not requiring a frame member to be unbolted in order to remove the powertrain component.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A powertrain component mount assembly comprising:
a pair of pillars;
each pillar comprising a joining wall comprising a transverse directed attachment point for attaching to a powertrain component;
each pillar further comprising two side walls formed on opposite ends of the joining wall, the side walls comprising first recesses at a lower end for attaching to a lower frame member;
the side walls comprising second recesses at an upper end for attaching to upper frame members;
the side walls comprising first drive axis directed attachment points proximal to the upper end for attaching to upper suspension members; and the side walls comprising second drive axis directed attachment points proximal to the lower end for attaching to lower suspension members;
wherein one of the side walls comprises an access hole adjacent to the transverse directed attachment point of the joining wall.

2. The power component mount assembly of claim 1, the joining wall comprising a third recess at the upper end.

3. The power component mount assembly of claim 1, the pillars shaped such that when mounted vertically in a mirrored configuration they form an inner separation that widens from the lower end to the upper end.

4. The power component mount assembly of claim 1, each side wall comprising a flange.

5. The power component mount assembly of claim 1, the side walls comprising a first plurality of lightening holes.

6. The power component mount assembly of claim 5, the joining wall comprising a second plurality of lightening holes.

7. A mount for a powertrain component of a vehicle, the mount comprising:
a plurality of singular pillars each comprising:
an upper attachment point for an upper suspension member, the upper attachment point accepting along a first axis a first removable fastener to couple with the upper suspension member;
a lower attachment point for a lower suspension member, the lower attachment point accepting along an axis parallel to the first axis a second removable fastener to couple with the lower suspension member; and
an intermedial attachment point for the powertrain component, the intermedial attachment point positioned between the upper attachment point and the lower attachment point, the intermedial attachment point accepting, along a second axis substantially perpendicular to the first axis, a third fastener to couple with the powertrain component;
wherein each of the pillars comprises a joining wall having the intermedial attachment point, and two side walls on opposite ends of the joining wall having the upper attachment point and the lower attachment point, wherein the pillars each comprise an upper end proximal to the upper attachment point, the upper end formed with a first recess in the two side walls to receive upper frame members of the vehicle directed along a drive axis of the vehicle, and a second recess in the joining wall extending in a second direction perpendicular to the drive axis to receive a transverse directed upper frame member of the vehicle.

8. The mount of claim 7, the pillars each comprising a lower end proximal to the lower attachment point, the lower end formed with a recess to receive a lower frame member of the vehicle.

9. The mount of claim 8, wherein the lower frame member comprises a tow hook mount that forms an apex extending toward an end of the vehicle.

10. The mount of claim 7, wherein the two side walls extend transversely from the joining wall to define a space between the two side walls, and wherein a portion of each of the first removable fastener, the second removable fastener and the third fastener resides in the space.

11. The mount of claim 7, wherein one of the side walls comprises an access hole adjacent to the intermedial attachment point to facilitate access to the third fastener.

12. The mount of claim 7, the pillars each having a ½ I-beam shape.

13. The mount of claim 7, the pillars formed such that when mounted vertically on the lower frame member they form a widening separation between the lower attachment point and the upper attachment point.

14. A vehicle powertrain component mount assembly comprising:
a pair of pillars spaced apart in a lateral direction of a vehicle to define a gap between the pair of pillars; and
a powertrain component disposed in the gap and directly attached to the pillars such that forces acting on the pair of pillars are transferred to the powertrain component;
wherein each of the pillars comprises an upper attachment point for attaching an upper suspension member with a first removable fastener, a lower attachment point for attaching a lower suspension member with a second removable fastener, and an intermedial attachment point for attaching the powertrain component with a third removable fastener;
wherein each of the pillars comprises a joining wall attached to the powertrain component, and two side walls on opposite ends of the joining wall for attaching to the upper suspension member and the lower suspension member, wherein a space is defined between the two side walls such that a portion of each of the first removable fastener, the second removable fastener and the third removable fastener resides in the space.

15. The vehicle powertrain component mount assembly of claim 14, wherein the powertrain component is attached to each of the pillars between the upper attachment point and the lower attachment point.

16. The vehicle powertrain component mount assembly of claim 14, wherein the powertrain component is attached to the pillars through the third removable fastener extending in a lateral direction of the vehicle, and each of the pillars is configured to receive the first removable fastener and the second removable fastener extending in a longitudinal direction of the vehicle to attach the upper suspension members and the lower suspension members.

17. The vehicle powertrain component mount assembly of claim 14, the pillars each comprising a lower end proximal to the lower attachment point, the lower end formed with a recess to receive a lower frame member of the vehicle.

18. The vehicle powertrain component mount assembly of claim 17, the pillars each comprising an upper end proximal to the upper attachment point, the upper end formed with an upper recess to receive upper frame members of the vehicle.

19. The vehicle powertrain component mount assembly of claim 14, wherein one of the side walls comprises an access hole adjacent to the intermedial attachment point to facilitate access to the third removable fastener.

20. The vehicle powertrain component mount assembly of claim 14, wherein the pillars each comprise an upper end proximal to the upper attachment point, the two side walls include a first recess in the upper end to receive upper frame members of the vehicle directed along a longitudinal direction of the vehicle, and the joining wall includes a second recess in the upper end in to receive an upper frame member directed along a lateral direction of the vehicle.

* * * * *